United States Patent [19]

Lazaro

[11] Patent Number: 4,976,836

[45] Date of Patent: Dec. 11, 1990

[54] OXIDIZERS FOR CATHODIC ELECTROCOATING PROCESS

[75] Inventor: Eulogio D. Lazaro, Brecksville, Ohio

[73] Assignee: The Glidden Company, Cleveland, Ohio

[21] Appl. No.: 41,931

[22] Filed: Apr. 24, 1987

[51] Int. Cl.$^5$ ............................................. C25D 13/06
[52] U.S. Cl. ................................. 204/181.7; 524/901; 523/403; 523/406; 523/412; 523/413; 523/414
[58] Field of Search ............... 204/181.7, 181.4, 181.6; 524/901; 523/403, 406, 408, 412, 413, 414

[56] References Cited

U.S. PATENT DOCUMENTS 4,293,398 10/1981 Prucnal ............................ 204/181.7
4,554,212 11/1985 Diefenbach ...................... 204/181.7

Primary Examiner—T. Tung
Assistant Examiner—Ben C. Hsing
Attorney, Agent, or Firm—Thomas M. Schmitz

[57] ABSTRACT

Cathodic electrocoating compositions and processes are improved by the addition of at least 0.10% hydrogen peroxide by weight based on polymer to electrocoating composition.

4 Claims, No Drawings

OXIDIZERS FOR CATHODIC ELECTROCOATING PROCESS

BACKGROUND OF THE INVENTION

The invention pertains to cathodic electrocoating processes and particularly to an improved cathodic electrocoating composition and process based on the addition of peroxide to the electrocoating bath.

Non-uniformity of phosphate coatings on steel and the presence of pores, especially when no chrome sealer was used, present problems in electrocoating. The uneven current distribution due to conductivity differences in the metal surface affects coating uniformity. This is especially true of coatings with poor coalescing properties (latices). Formation of ridges is not uncommon for these types of coatings. With solution polymers, gassing in the cathode will cause this coating non-uniformity. These problems lead to poor appearance and coating performance. In cathodic electrodeposition, the evolution of hydrogen gas at the cathode is known to cause foaming and the formation of pores and pits in the deposited coating. This gives rise to the formation of non-uniform coatings that have poor resistance to chemical attack because of voids present in the coating. Appearance and performance properties are both important for primers and one coat systems.

It now has been found that the addition of oxidizers, especially hydrogen peroxide, to cathodic electrocoating compositions substantially improves the properties of such electrocoated and cured paint films. The incorporation of hydrogen peroxide solutions into the cathodic electrocoating baths avoids the evolution of hydrogen gas at the cathode and avoids the formation of pores and pits in the film. With improvements in coating uniformity due to the absence of trapped gases, contact between the metal and the coating is improved and thus the adhesion. Improvement in salt spray and detergent resistance follows improvement in adhesion. The incorporation of a 30% hydrogen peroxide solution was found to improve coating appearance and performance. These improvements were found in both cationic latices and solution polymers when tested at levels dependent on the demands of the formulations. Incorporation is by direct addition to either the electrocoat bath or to the resin or pigment components. A further improvement in the electrocoating process was realized in that iron does not dissolve in the electrocoating bath. Appearance improvements are smoothness, gloss, color, and pretreatment telegraphing. Performance improvements are salt spray resistance and adhesion. Further advantages of this invention include uniform coating appearance, improved gloss, minimizes staining and yellowing of baked coatings, improved coating adhesion to substrates, uniform coating appearance over both chrome and non-chrome rinsed substrates, and improved detergent resistance. These and other advantages of this invention shall become more apparent by referring to the detailed description of the invention and the illustrative examples.

SUMMARY OF THE INVENTION

Briefly, the invention relates to cathodic electrocoating compositions comprising emulsion coatings or water dispersed polymers useful in cathodic electrocoating wherein the improvement comprises the addition of hydrogen peroxide to the electrocoating composition to improve the electrocoating process. Between 0.10% and 10% by weight hydrogen peroxide based on polymer content can be added.

DETAILED DESCRIPTION OF THE INVENTION

The invention pertains to the inclusion of hydrogen peroxide into a cathodic electrocoating composition to improve the electrocoating process and the resulting paint films.

Hydrogen peroxide can be diluted in an aqueous medium at dilution levels between 3% and 90% by weight hydrogen peroxide where between 30% and 35% levels are preferred. In accordance with this invention, hydrogen peroxide can be added to the electrocoating composition on a weight percent basis at least about 0.10% and preferably between 0.10% and 10% hydrogen peroxide based on the weight of polymer solids in the aqueous electrocoating composition.

Electrocoating polymeric compositions useful as binders in the cathodic electrocoating composition include emulsion polymer as well as water dispersed polymers. A water dispersed polymer is a polymer or resin selected according to final desired use from a wide variety of known polymers in the electrocoating art which contain pendant primary and/or secondary amine groups. By protonating such amine groups, the polymer can be water dispersed. Electrodeposition of the polymer de-protonates the amine groups for crosslinking with the crosslinking agent. Amine groups can be attached to the polymer by reacting free carboxyl groups to a polymer (polyester, acrylic, urethane, etc.) containing available carboxyl groups which can be reacted with alkyleneimine or substituted alkyleneimine, as proposed in U.S. Pat. No. 3,679,564 and U.S. Pat. No. 3,617,458, and incorporated herein by reference. Similarly, amine groups can be introduced into the polymer by reacting pendant carboxylic acid groups on a polymer with ethylene imine or derivatives of ethylene imine. Difunctional amines also can be reacted with reactive pendant carboxyl groups on the polymer. Blocked amines also can be attached to the polymer and subsequently transformed into primary amine groups by an appropriate reaction. Such blocked amine groups can be attached to epoxy resins or acrylic resins having pendant oxirane groups by reacting a ketimine blocked diethylene triamine, formed from reacting diethylene triamine with an excess of methyl ethyl ketone, with the polymer.

The primary and/or secondary amine groups are pendantly attached to the polymer and include terminal amine groups. By pendantly attached is meant that such amine groups are attached to the polymer chain or to a pendant side chain of the polymer. The polymer containing pendant amine groups should contain at least about 5% by weight of such pendant amine groups, and up to about 50% if desired.

Representative polymers containing pendant amine groups can be derived from epoxy and epoxy-modified diglycidyl ethers of bis-phenol A structures, various aliphatic polyethylene or polypropylene glycol (diglycidal ether) adducts, and glycidyl ethers of phenolic resins, such epoxy resins being commercially available and commonly used in the electrocoating field.

Other useful polymers containing pendant amine groups include polyamide resins, for example, condensation products of dimerized fatty acids coreacted with difunctional amine, such as ethylene diamine. Polyamide resins generally are between about 500 and about 5,000 molecular weight. Further useful electrocoating polymers containing pendant amine groups include acrylic resins having molecular weight of about 1,000 to about 100,000 polyester resins and polyurethane resins both having a molecular weight range of about 500 to about 5,000 vinyl resins and amine resins. Addition copolymers produced from copolymerized ethylenically unsaturated monomers copolymerized in bulk or solvent can be copolymerized with acrylic monomers to produce acrylic copolymers which can be dispersed into water to form an electrocoating composition. The molecular weight of such polymers are preferably between bout 3,000 and 50,000. Useful ethylenically unsaturated monomers include, for example, lower alkyl esters of acrylic or methacrylic acid such as methyl-, ethyl-propyl-, butyl-, acrylates or methacrylates, 2-methylhexyl acrylate, n-octyl acrylate, 2-ethyl-hexyl acrylate, as well as similar methacrylates. Minor amounts of other ethylenic monomers include vinyl aromatic hydrocarbons such as styrene, alpha-methyl styrene, similar alkyl styrene, vinyl toluene, vinyl naphthalene, and divinyl benzene; aliphatic hydrocarbons such as 1,3 butadiene, methyl-2-butadiene, 1,3-peperylene, cyclopentadiene, dicyclopentadiene, 2,3-dimethyl butadiene, and similar conjugated polyolefins; vinyl halides such as vinyl chloride and vinylidene chloride; and vinyl esters such as vinyl acetate. Particularly preferred ethylenically unsaturated monomers include alkyl acrylates and methacrylates with minor amounts of styrene, alpha-methyl styrene, t-butyl styrene, 1,3-butadiene, isoprene, and acrylonitrile.

The polymer is rendered water soluble by adding sufficient acid to the polymer to completely neutralize the polymer. Appropriate acids are, for example, proton-donating acids such as phosphoric, sulfuric, hydrochloric, acetic, formic, lactic, and other proton-donating organic and inorganic acids. Water solubility is achieved by the protonating of all (primary, secondary and tertiary if there by any) amine groups of the polymer by the acid. The protonating of the amine groups of the polymer also renders the polymer positively-charged so that during electrodeposition the polymer can migrate to the cathode substrate and be deposited thereon. A polymer having blocked amine groups is treated with a proton-donating acid in water in order to protonate all amine groups for water solubility of the polymer and to remove the blockings group from the pendant amine groups in order to convert such tertiary amine groups into protonated primary amine groups.

In a similar manner, cation latex compositions made by emulsion copolymerization are useful in accordance with this invention. Such cationic emulsion polymers can be produced from nonionic monomers and include for instance alkenyl aromatic compounds such as styrene compounds; derivatives of alpha-methylene monocarboxylic acids such as acrylic esters, acrylic nitriles, and methacrylic esters; derivatives of alpha-, beta-ethylenically unsaturated dicarboxylic acids such as maleic esters and unsaturated alcohol esters; conjugated dienes; unsaturated ketones; unsaturated ethers; and other polymerizable vinylidene compounds such as vinyl chloride and vinyl fluoride. Specific ethylenically unsaturated compounds useful for the instant latices include styrene, alpha-methylstyrene, para-methylstyrene, ethylstyrene, diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethyhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl alpha-chloroacrylate, ethyl maleate, vinyl acetate, vinyl propionate, vinyl chloride, vinyl bromide, vinylidene chloride, vinylidene fluoride, vinyl methyl ketone, methyl isopropenyl ketone, vinyl ethyl ether, 1,3-butadiene, and isoprene.

Most of the foregoing nonionic monomers are usually copolymerized with monomers having hydrophilic character for the purpose of crosslinking capability and/or providing the needed cation activity. Representative of such modifying monomers are hydroxyethyl acrylate, hydroxyethyl methacrylate, hydroxypropyl methacrylate, acrylamide, methacrylamide, and modified acrylamides such as diacetone acrylamide and diacetone methacrylamide, and dimethylaminoethyl methacrylate, diethylaminoethyl methacrylate, t-butylaminoethyl methacrylate, isopropylaminopropyl methacrylamide, dimethylaminopropyl methacrylamide.

Cathodic electrocoating compositions based on synthetic latex binders are disclosed in U.S. Pat. Nos. 4,017,372; 4,225,406; 4,511,446; 4,512,060; 4,525,260; 4,608,139; and 4,624,762 and are incorporated herein by reference.

The matrix copolymer containing hydroxyls or carboxyls are adapted to be crosslinked with aminoplast resins such as melamine-formaldehyde. Melamine resins can be selected from melamine or melamine derivatives such as methylol melamine or similar alkylated melamine-formaldehyde reactive resins commonly referred to as aminoplast resins. Melamine resins, for instance, can cross-link hydroxyl containing polyurethane-acrylic matrix copolymers when heat cured at temperatures of about 300° F. to 400° F. for about 20 minutes. Ordinarily, about 65–70 weight parts of polyurethane-acrylic matrix copolymer mixed with about 25 to 35 weight parts melamine crosslinker to provide a resin mixture containing between about 20% to 40% by weight melamine. Other crosslinkers such as blocked isocyanates, phenolic resins, etc., can also be used.

The matrix polymer mixed with aminoplast resin or other crosslinker can be dispersed in water by adding polymer to a water bath containing the proper solubilizing salt such as proton donor salt for cathodic compositions and amines or bases for anodic compositions. The polymer solids content of the electrocoating bath can be generally between 5% and 25% by weight and preferably, between 5% and 15%. The electrocoating composition can be electrocoated onto a cathode substrate by passing direct electric current between the cathode and anode to electrodeposit a coating onto a cathode substrate. The substrates are electrically conductive metal such as iron, steel, aluminum, galvanized steel, zinc, and similar electroconductive materials.

Electrocoating is carried out at a voltage above the threshold voltage of the electrocoating paint composition which is the voltage at which the polymer will electrocoat due to a direct electric current being passed through the electrocoating bath. The maximum tolerable voltage is slightly below the rupture voltage of the paint coating being applied to the substrate, where the rupture voltage is that voltage which causes the paint film already applied to rupture upon continued application of such voltage. The desirable voltage is between 20 and 500 volts and preferably between 50 and 300 volts. The temperature of the electrocoating bath is generally between 15° C. and 50° C. and preferably between 20° C. and 35° C. Agitation is preferred to maintain uniformity of the dilute polymer solution.

The invention and merits of this invention are further explained in the following illustrative examples.

EXAMPLE 1

The following were prepared for testing: Latex electrocoat bath at 10% solids and binder to pigment ratio of 8 to 1.

| | |
|---|---|
| Deionized Water | 200.00 |
| Pigment dispersion in epoxy | 34.60 |
| Cationic latex | 225.90 |
| Deionized water | 631.20 |
| Texanol | 6.30 |
| Hydrogen Peroxide | 0.50 to 5.50 |

Steel panels coated after the bath was ion exchanged, before the addition of the hydrogen peroxide, were rough with thick and heavy ridges running vertical on the surface of the panels. After the addition of the hydrogen peroxide, this coating became smooth.

EXAMPLE 2

A gray and white standard cathodic bath was also tested for coating appearance, color, gloss, and salt spray resistance before and after the hydrogen peroxide solution.

(a) Gray Cathodic Electrocoat

| Color | Before $H_2O_2$ | After $H_2O_2$ |
|---|---|---|
| L | 42.99 | 43.75 |
| a | −1.17 | −1.17 |
| b | −0.37 | −0.05 |
| Gloss | 42.20 | 47.50 |
| Appearance | Slightly rough | Smooth |
| Salt spray | ¼" Delamination from scribe after 144 hrs. | ⅛" Delamination from scribe after 144 hrs. |
| Substrate | DI rinsed EP 10 | (No chrome) |

(b) White Cathodic Electrocoat

| Color | Before $H_2O_2$ | After $H_2O_2$ |
|---|---|---|
| L | 82.19 | 83.88 |
| a | −2.43 | −2.38 |
| b | 7.40 | 5.41 |
| Gloss | 58 | 61.90 |

Results on the cationic latex had been replicated several times with consistent results.

I claim:

1. In a cathodic electrocoating process for electrodeposition of a heat curable electrocoating composition containing a coreactive crosslinker onto a cathode substrate, the electrocoating composition containing a polymeric binder dispersed into an aqueous electrocoating bath solution, the polymeric binder containing carboxyl or hydroxyl groups for crosslinking with the crosslinker upon deposition onto a cathode substrate and heat curing the electrocoating composition, the improvement comprising:

adding to the electrocoating composition before electrocoating onto a cathode substrate, at least about 0.1% hydrogen peroxide based on the weight of polymeric binder and the crosslinker in the aqueous electrocoating composition where the addition of said hydrogen peroxide avoids evolution of hydrogen gas at the cathode during the electrocoating process.

2. In the process in claim 1, wherein the electrocoating composition contains between 0.1% and 10% by weight hydrogen peroxide.

3. A cathodic electrocoating composition for electrodeposition onto a cathode substrate, the electrocoating composition containing a heat curable matrix polymer and an organic cross-linking compound adapted to coreact with the matrix polymer upon heat curing the electrocoated composition deposited on the cathode substrate, the improvement comprising said electrocoating composition containing at least 0.1% hydrogen peroxide by weight added to the electrocoating composition based on the combined weight of said matrix polymer and said organic cross-linking compound where the addition of said hydrogen peroxide avoids the evolution of hydrogen gas at the cathode during the electrocoating process.

4. The electrocoating composition in claim 3 wherein the hydrogen peroxide level is between 0.1% and 10% hydrogen peroxide by weight.

* * * * *